(12) United States Patent
Sorenson et al.

(10) Patent No.: US 6,526,728 B1
(45) Date of Patent: Mar. 4, 2003

(54) METHOD AND APPARATUS FOR SEALING ARTICLES

(75) Inventors: Gregg R. Sorenson, West Allis, WI (US); Mark A. Kubisiak, Franklin, WI (US)

(73) Assignee: Conflex Incorporated, Milwaukee, WI (US)

( * ) Notice: Subject to any disclaimer, the term of this patent is extended or adjusted under 35 U.S.C. 154(b) by 52 days.

(21) Appl. No.: 09/695,962

(22) Filed: Oct. 25, 2000

(51) Int. Cl.[7] .............................. B65B 9/06; B65B 51/24
(52) U.S. Cl. ......................... 53/450; 53/459; 53/373.5; 53/374.3; 53/550; 53/568
(58) Field of Search ........................... 53/450, 459, 479, 53/550, 568, 371.3, 373.4, 373.5, 373.7, 374.3–374.6, 375.4; 156/251, 496, 515

(56) References Cited

U.S. PATENT DOCUMENTS

| | | | |
|---|---|---|---|
| 3,355,337 A | * 11/1967 | Zelnick | 156/515 |
| 3,355,857 A | * 12/1967 | Tobey | 156/515 |
| 3,357,151 A | * 12/1967 | Monaghan | 53/450 |
| 3,625,802 A | * 12/1971 | Schniepp | 156/251 |
| 3,633,333 A | * 1/1972 | Schlemmer et al. | 53/373.4 |
| 3,665,673 A | * 5/1972 | Billett et al. | 53/450 |
| 4,219,988 A | 9/1980 | Shanklin et al. | |
| 4,858,416 A | * 8/1989 | Monaghan | 53/373.5 |
| 5,165,221 A | * 11/1992 | Udelson et al. | 53/550 |
| 5,341,623 A | * 8/1994 | Siegel | 53/450 |
| 5,417,041 A | * 5/1995 | Hansen et al. | 53/373.5 |
| 5,444,964 A | * 8/1995 | Hanagata | 53/373.5 |
| 5,603,801 A | * 2/1997 | DeFriese et al. | 156/251 |
| 5,761,878 A | * 6/1998 | Walkiewicz et al. | 156/515 |
| 5,956,931 A | * 9/1999 | Stork | 53/550 |
| 6,027,596 A | * 2/2000 | DeFriese et al. | 156/251 |

FOREIGN PATENT DOCUMENTS

| | | | | |
|---|---|---|---|---|
| JP | 6-64627 A | * | 3/1994 | 53/374.4 |
| JP | 6-99913 A | * | 4/1994 | 53/374.4 |

* cited by examiner

*Primary Examiner*—Stephen F. Gerrity
(74) *Attorney, Agent, or Firm*—Joseph S. Heino

(57) ABSTRACT

A method and apparatus for grasping and advancing adjacent layers of thermoplastic film through the side sealing mechanism of a packaging machine includes a plurality of belts which travel about two sets of cooperating pulleys. Each pulley has two circumferential belt grooves defined within it, each belt groove being functionally adapted to allow the travel of a belt along it. A first line of travel is defined along a path which is parallel with the line of travel for articles moving along the wrapping machine. The second line of travel diverges away at a slight angle. The belts are truncated V-belts, the "truncated V" portion of the belts being disposed outwardly of the pulleys. Each set of pulleys is offset such that the belts cooperate in tooth-meshing fashion. A tail pulley of each set is mounted in an offset cam fashion and is spring loaded to apply tension to the belts. Disposed between the belt paths is a hot wire assembly having a similarly longitudinally diverging hot wire. The hot wire assembly utilizes one mounting block which is stationary and another which is rotatable. The mounting blocks are provided with means for allowing insertion of hot wire end connectors at a predetermined depth. An end sealing apparatus includes means for adjusting the end seal location relative to the vertical height of the article to be wrapped.

29 Claims, 9 Drawing Sheets

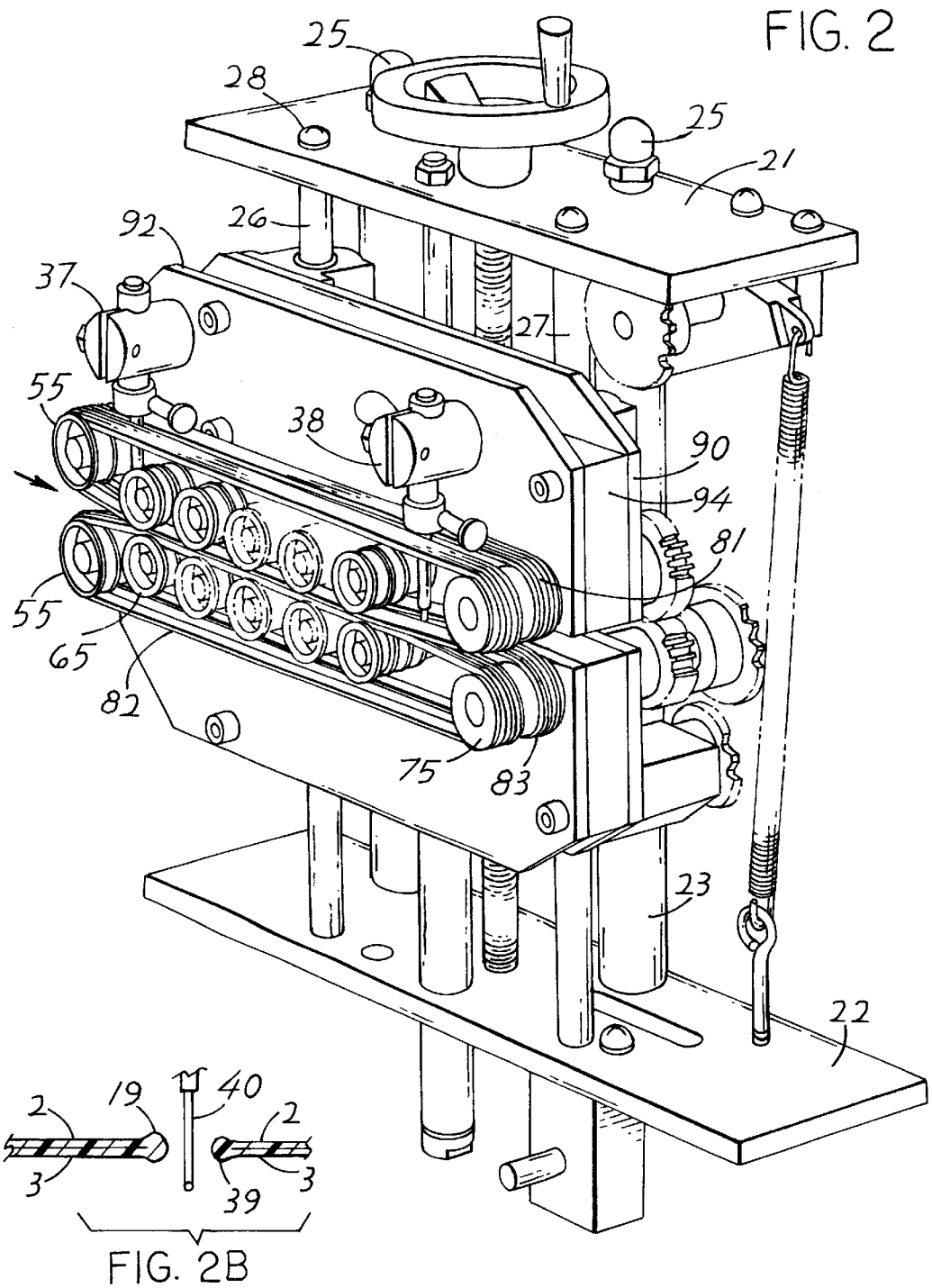
FIG. 2
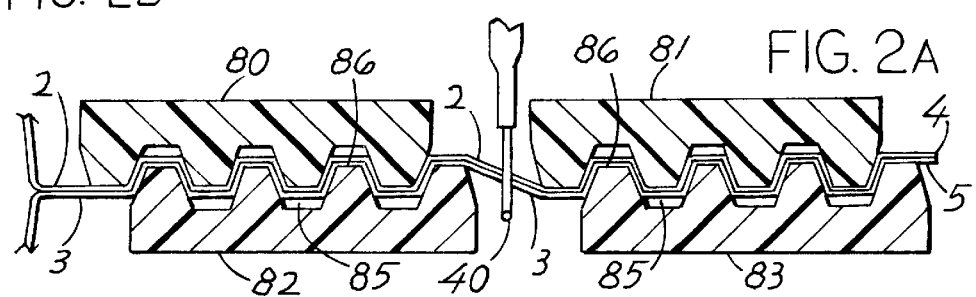
FIG. 2B
FIG. 2A

METHOD AND APPARATUS FOR SEALING ARTICLES

FIELD OF THE INVENTION

This invention relates generally to automatic package or article wrapping methods and devices. More particularly, it relates to a method and apparatus for heat sealing articles within a thermoplastic film as the articles move at a high rate of speed through an article wrapping machine.

BACKGROUND OF THE INVENTION

Machines for wrapping articles and packages with a heat sealable thermoplastic film are known art. Indeed, such machines have been utilized commercially for several decades. In a typical configuration, the package wrapping machine advances a steady stream of articles along a conveyer belt and towards a plastic envelope. This plastic envelope is formed by providing a roll of center-folded thermoplastic film which is situated to one side or the other of the conveyer. A continuous sheet of center-folded plastic film is pulled from the roll and is presented along a line which is typically perpendicular to the conveyer and perpendicular to the path of the articles which are moving along that conveyer. Means for separating the adjacent layers of film in the center-folded configuration is provided by use of a film inverter. The film inverter separates and opens the film envelope and reverse folds, or inverts, the film envelope such that the advancing articles are effectively captured by the film envelope and interposed between the adjacent film layers. As the enveloped articles continue their advance, leaving the film inverting area of the machine, one continuous side or edge of the film envelope remains open. A side sealing mechanism is provided for effectively welding or sealing the continuous side or edge of the adjacent and open film layers. Once side sealed, this mechanism provides a generally tube-like thermoplastic envelope for the articles. As the articles and the continuous side sealed plastic film envelope which covers them continue to advance along the machine, an end sealer effectively welds or seals a leading edge of the envelope and then reciprocates to the rear of the article, or simply allows the article to advance, to then weld or seal the trailing edge of the envelope. In this fashion, the leading edge of the next-in-line article is also sealed and the process is repeated.

In the experience of these inventors, one problem which is inherent to the side-sealing action of presently used packaging machines is that incomplete seams or welds often result in the side sealer portion of the machine. This is particularly true if the film tensions are not adequately maintained within the side-sealing portion of the machine as the film is advanced. That is, thermoplastic film which is not properly or adequately grasped within, or advanced by, the side sealer mechanism can result in adjacent film layers which are misaligned or simply not maintained in close enough proximity to one another to form a proper weld or seal as the layers are drawn into the vicinity of a hot wire or weld element. Similarly, adjacent film layers which are not maintained in proper alignment may result in welds which not only appear crumpled or wrinkled, but which are effectively incomplete. If adjacent film layers cannot be brought close enough together during the side-sealing process, it may be necessary to make other adjustments such as increasing the temperature of the weld element, or increasing the time that any given portion of the continuous film layers must remain in welding vicinity to the weld element. This latter adjustment essentially amounts to a slowing down of the packaging process and a net reduction in production.

Another problem which arises is the need to replace the "consumables" of the packaging machine. In the experience of these inventors, the consumables take two forms—the drive belts of the side sealer mechanism which are functionally intended to grasp and advance the thermoplastic film—and the weld element itself. In the case of any particular packaging project, drive belt breakage and weld element burn-out are recognized, though unwelcomed, inconveniences. Once broken, drive belt replacement is absolutely necessary for the continued successful operation of the machine. And, suffice it to say that no welds will be made without a properly functioning weld element. The replacement of such consumables, however, is often easier said than done. The reality being that production must come to a halt and, in the case of a broken belt, the belt drive and tail pulleys must be untensioned by use of the proper tools to allow a new belt to be stretched over them and properly seated back into place. In the case of the malfunctioning or shorted out weld element, it too must be replaced by untensioning the weld element fastening means to either end of the weld element by use of the proper tools and by resetting the newly placed weld element to the proper depth and taper so as to allow optimum performance of the weld element. All of this often requires the use of several tools, is time consuming and is surely not something that the production manager looks forward to.

Further in the experience of these inventors, the weld or heat element of the present generation of side sealer mechanisms which are incorporated into packaging machines may also have a tendency to degrade a weld which is, at least initially, completely and acceptably formed. That is, the weld which is formed within the side sealer may leave the welding area in perfect or near perfect condition. If the weld is overexposed to the heat of the hot wire or weld element, by spending too much time near or traveling too close to the wire or element after the weld is formed, the weld quality will be compromised. In extreme cases, the weld may actually be reopened. This too is an unacceptable result in the overall quality of production.

Another problem associated with present packaging machines is that the end sealing mechanisms incorporated in such machines create end seals which may also display weld inconsistencies. One explanation for this, in the view of these inventors, is that the article which is enveloped within the so-called plastic film "tube" typically has some height or thickness to it. While some articles are very thin, others are more bulky. For articles with any substantial girth, sealing of the film should optimally occur at or very near to the horizontal midline of the article. In this fashion, an equal amount of film is pulled down around the article from the top film layer as is pulled up around the article from the bottom film layer. This is not, however, how most articles are typically end sealed using machines that are available today. To the contrary, the surface upon which the article rests typically provides the horizontal reference point at which the article is sealed instead.

SUMMARY OF THE INVENTION

The present invention overcomes these problems and disadvantages. It provides a new and useful method and apparatus for securely grasping and advancing the adjacent layers of thermoplastic film through the side sealing mechanism of a packaging machine. It also provides a new and useful method and apparatus for maintaining integrity of the heat-induced weld which is created at the side sealing mechanism and at the end sealing mechanism of the packaging machine. It also provides a new and useful method and apparatus which accomplishes all of this while making the side sealing mechanism an apparatus in which the consumables utilized within the mechanism can be maintained or replaced by the user without the need for tools or special adjustments.

The present invention accomplishes this by providing a plurality of film grasping belts which travel about two sets of cooperating pulleys, each pulley set including a drive pulley, a tail pulley and a number of idler pulleys disposed between the drive pulley and the tail pulley. Each pulley—drive, tail and idler—has two circumferential belt grooves defined within it, each belt groove being functionally adapted to allow the travel of a belt along it as the pulley is rotated about a central axis. A first line of travel about the pulleys is defined within the cooperating pulleys along a path which is substantially parallel with the line of travel of an article which is being advanced by the wrapping machine. The second pulley line of travel is defined within the cooperating pulleys along a path which diverges away at a slight angle relative to that path of travel. The grooves or pathways of the cooperating drive and tail pulleys of each set are cooperatively tapered or beveled so as to allow this divergence and to prevent the belt from "walking" out of the grooves. The belts which are used in the method and apparatus of the present invention are V-ribbed belts, the "V-ribbed" portion of the belts being disposed outwardly of the pulleys and the flat belt portion being immediately adjacent the pulleys. Each pair of cooperating pulleys is offset by an amount which is equal to one-half of the pitch of one rib and groove of each V-ribbed belt such that the belts engage each other in tooth-meshing fashion. This meshing action is functionally adapted to firmly grasp a pair of thermoplastic film layers therebetween and to prevent slippage therefrom. It should also be noted that the contour of the belt may be varied without deviating from the scope of this invention.

The tail pulley of each pulley assembly is, in the preferred embodiment, mounted in an offset cam fashion and is spring loaded to apply tension to the belts. A rotational handle is also provided. This feature allows torsional pressure to be applied to the tail pulley by the user for quick and tool-less removal of a damaged or broken belt.

Disposed between the divergent belt paths is a hot wire assembly which is functionally adapted to weld the thermoplastic layers together as the plastic film passes near the hot wire. This hot wire assembly is constructed such that the hot wire itself drops down along a line which is at a slight angle relative to the horizontal. It is also constructed such that the hot wire itself is divergent away from the path of travel of the article being sealed. This feature prevents over-exposure of the weld to the hot wire thereby maintaining weld integrity. The hot wire assembly, in the preferred embodiment, utilizes a first wire mounting block which is stationary and a second wire mounting block which is rotatable. A rotational handle is provided. This feature allows torsional pressure to be applied to the rotatable mounting block by the user for quick and tool-less removal of a damaged or burned out hot wire. The mounting blocks of the hot wire assembly are also provided with means for allowing insertion of the hot wire end connectors at a predetermined depth which preserves the preset angle relative to the horizontal and which does away with any need to measure or manually adjust wire depth or angle.

Following the side sealing apparatus of the present invention is an end sealing apparatus which includes an elevation screw for adjusting the end seal location at a point which lies at the middle of the vertical height of the article to be wrapped. The elevation screw has a elevation screw nut which is attached to it, which is in turn attached to a rocker assembly for moving a horizontally disposed and vertically moving top seal bar downwardly and a cooperating bottom seal bar, likewise horizontally disposed and vertically movable, upwardly such that the top and bottom seal bars meet at the vertical center of the article.

In summary, the advantages of the invention are that it provides a method and apparatus for securely grasping and advancing the adjacent layers of thermoplastic film through the side sealing mechanism of a packaging machine; that it maintains integrity of the heat-induced weld which is created at the side sealing mechanism and at the end sealing mechanism; and which makes the side sealing mechanism an apparatus in which the consumables utilized by it can be quickly and easily maintained without the need for tools or readjustment.

The foregoing and other advantages of the method and apparatus of the present invention will be apparent from the description which follows.

BRIEF DESCRIPTION OF THE DRAWINGS

FIG. 2 is an enlarged front and right side perspective view of the side sealing apparatus of the present invention.

FIG. 2A is a greatly enlarged right side elevational view of the cooperating belts shown in the side sealing apparatus shown in FIG. 2.

FIG. 2B is another greatly enlarged right side elevational view showing a weld created along adjacent layers of thermoplastic material as they pass through the side sealing apparatus shown in FIG. 2.

DETAILED DESCRIPTION

Figure 1:
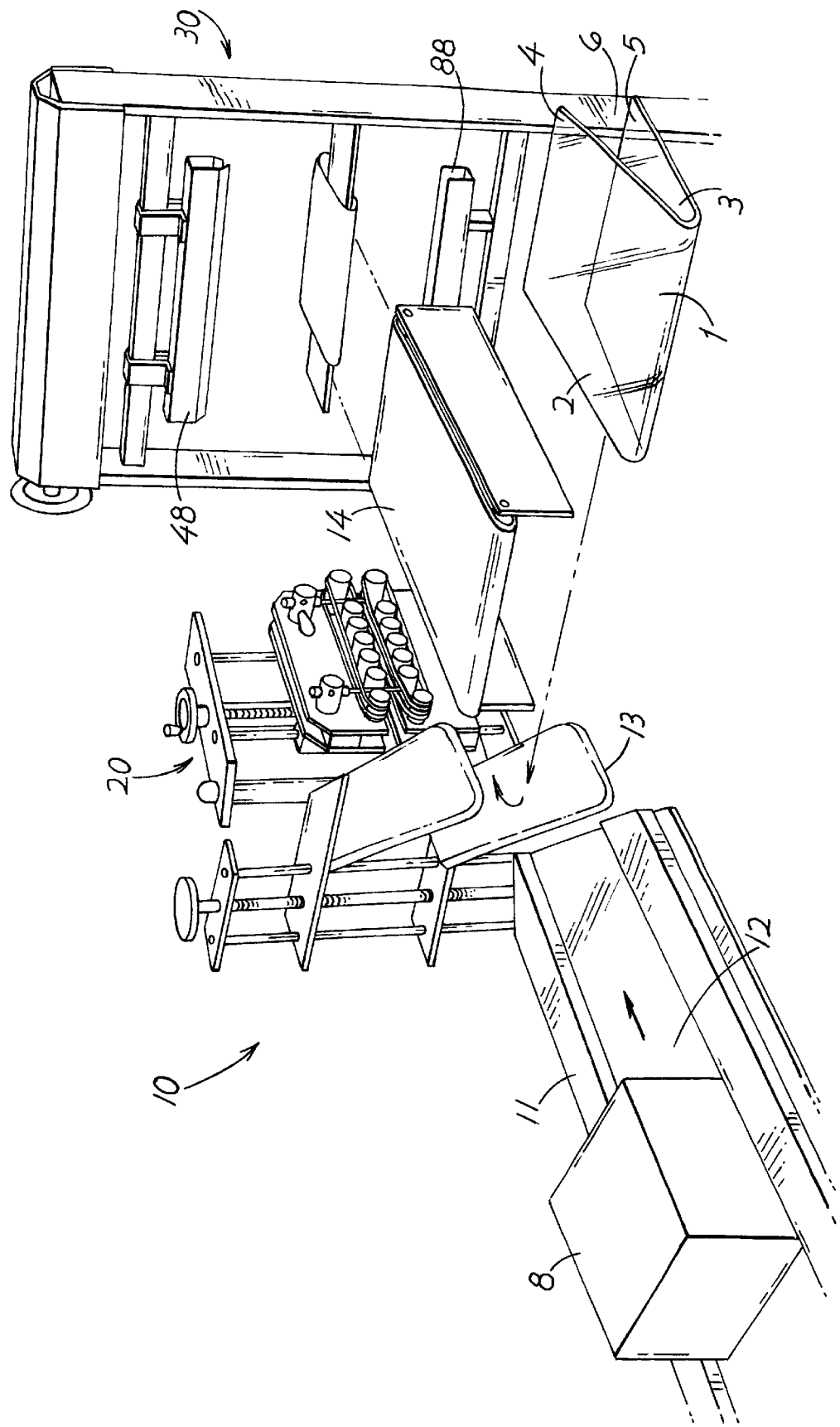
FIG. 1 is a perspective view of a packaging machine having a side sealing apparatus and an end sealing apparatus, both of which are constructed in accordance with the present invention.

Referring now to the drawings in detail, FIG. 1 illustrates a preferred embodiment of an apparatus utilizing the method of the present invention. The packaging machine, generally identified 10, includes a main table portion 11, a package conveyer belt 12, a plastic film inverter 13, and a discharge belt 15. The packaging machine 10 also includes a side seal assembly, generally identified 20, and an end seal assembly, generally identified 30. An intermediate belt 14 is situated immediately adjacent the side seal assembly 20.

As an article 8 to be wrapped approaches the film inverter 13, the article 8 enters an envelope which is created by a center folded sheet of thermoplastic film 1. The supply of film 1 is continuous and is fed from a roll (not shown) located to one side of the machine 10. As the article 8 passes through the inverter 13, there is a first layer 2 of thermoplastic film 1 which is disposed over the article 8, and a second layer 3 disposed beneath the article 8 such that the article 8 will continue to be carried along the table 11 atop the second film layer 3 and into the vicinity of the side sealer assembly 20. As the article 8 continues on its way, a continuous and open side 6 of the film envelope formed by the adjacent edges 4, 5 of the film 1 remains. The side sealer assembly 20 captures this open side or edge 6 and effectively welds or seals it thereby creating a generally tube-like plastic film envelope which effectively encircles the article 8. See FIG. 2.

Figures 3, 4:
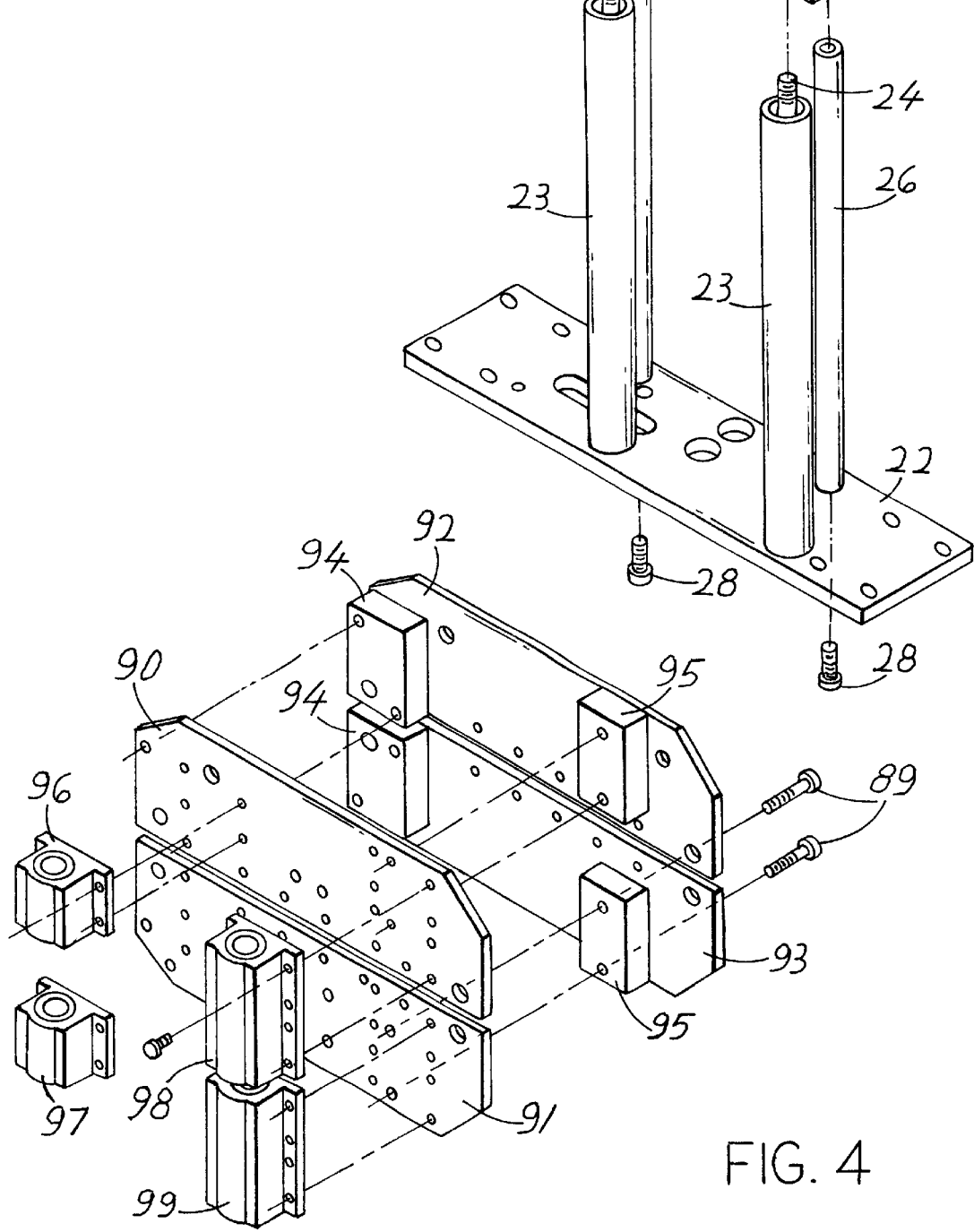
FIG. 3 is a rear and left side exploded perspective view of one subassembly of the side sealing apparatus shown in FIG. 2.
FIG. 4 is a rear and left side exploded perspective view of another subassembly of the side sealing apparatus shown in FIG. 2.

The side sealer assembly 20 is mounted to one side of the packaging machine 10 by means of a side seal bottom base plate 22 and a side seal top plate 21. See FIG. 3. The side seal base plate 22 and the side seal top plate 21 are separated by a pair of tubular column spacers 23 which are placed in tension by means of a rod 24 which is disposed to the inside of each spacer 23 by virtue of nuts 25 which are threaded onto the ends of the rods 24. Also disposed between the side seal base plate 22 and the side seal top plate 21 is a first linear bearing shaft 26 and a second linear bearing shaft 27. The first and second bearing shafts 26, 27, respectively, are each attached to the side seal top and base plates 21, 22, respectively, by means of a number of fasteners 28. The first linear bearing shaft 26 is functionally adapted to slidably receive a top seal frame bearing 98 and a bottom seal bearing 99. See FIG. 4. Similarly, the second linear bearing shaft 27 is functionally adapted to slidably receive a second top seal frame bearing 96 and second bottom seal bearing 97. The first and second top seal frame bearings 98, 96, respectively, are attachable to a seal frame upper back plate 90. Similarly, the first and second bottom seal frame bearings 99, 97, respectively, are attached to a seal frame lower back plate 91. A seal frame upper face plate 92 is provided as is a seal frame lower face plate 93. The upper seal frame face and back plates 92, 90, respectively, are attached to each other by means of a plurality of bolts 89 and with a seal frame head spacer and seal frame tail spacer 94, 95, respectively, interposed between them. Similarly, the lower seal frame face and back plates, 93, 91, respectively, are attached to each other with the head and tail spacers 94, 95 situated between them as well. It should be noted here that the bottom seal frame bearings 97, 99 are, in the preferred embodiment, machined to be 0.046 in. thinner than their top seal frame counterparts 96, 98. The purpose for this is to mount the top face plate 92 in a plane which is 0.046 in. forward of a plane which defines the bottom face plate 93. This detail will be discussed further later in this detailed description. It is also to be noted that the back plates and face plates, 90, 91, 92, 93, respectively, of the side sealer assembly 20 are shown attached to the packaging machine 10 in a given location. This location is determined by a number of factors, including which side of the machine 10 that the open side 6 of the film 1 is presented on and what direction the article 8 is to travel in. It is to be understood that, in the preferred embodiment, both top plates 90, 92 and both bottom plates 91, 93 could be interchanged so as to allow the article direction to change, and the side at which the film envelope edge 6 presents itself, as such is desired or required. In other words, the back and face plates, 90, 91, 92, 93, respectively, are functionally adapted to be assembled in another way and still come within the scope of the method and apparatus of the present invention. This is an advantage to the manufacturer, to production people and to end users alike.

Disposed outwardly of the upper and lower face plates, 92, 93, respectively, are a number of pulleys. Specifically, the preferred embodiment contemplates of use of a tail pulley 55, a front drive pulley 75 and a plurality of belt idler pulleys 65, the idler pulleys 65 being linearly disposed between the tail pulley 55 and the front drive pulley 75. See FIG. 2. Two sets of pulleys are provided, one set disposed immediately above the other. Each idler pulley 65, though identical in function, is configured slightly differently from the others as will become further apparent later in this detailed description.

Figure 7:
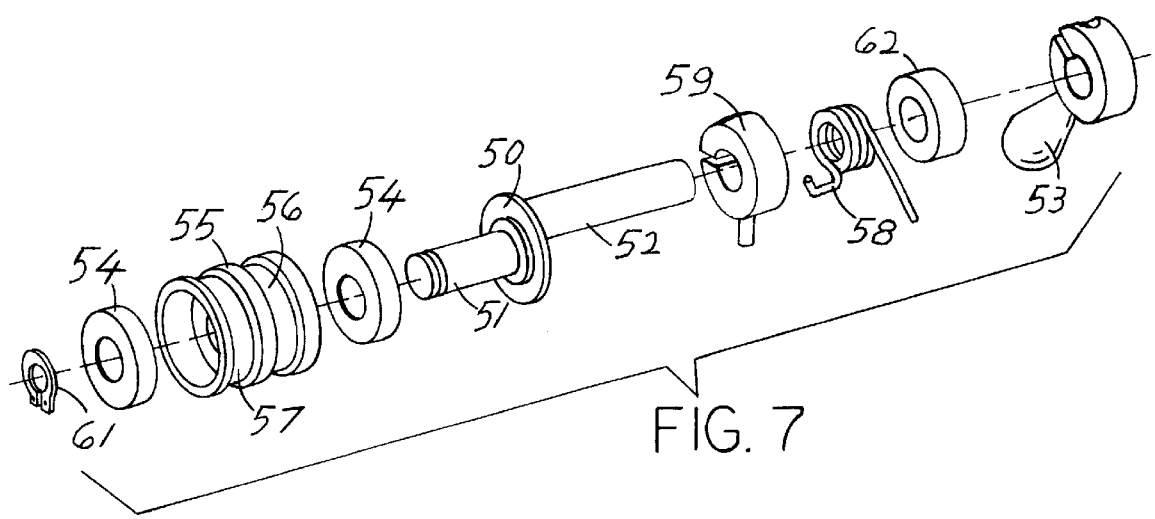
FIG. 7 is an exploded front and right side perspective view of a tail pulley subassembly of the side sealing apparatus shown in FIG. 2.
Figure 8:
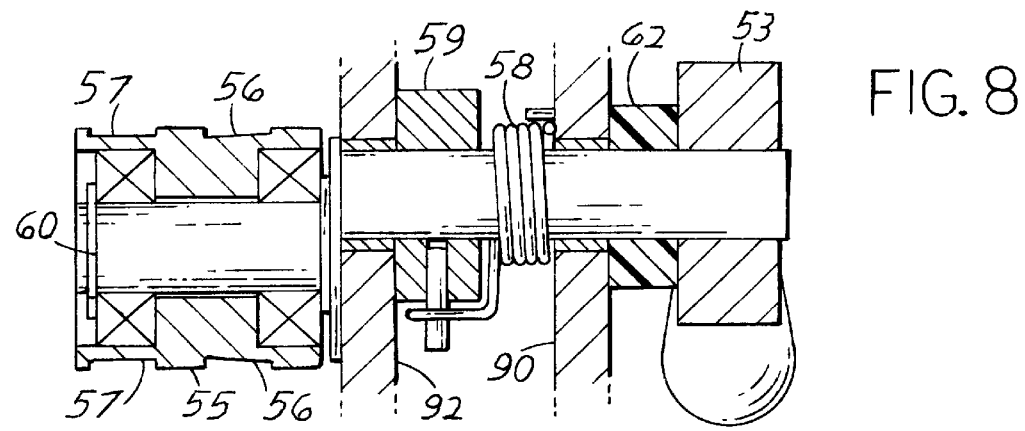
FIG. 8 is an enlarged cross-sectioned view of the tail pulley subassembly of the side sealing apparatus shown in FIG. 2.

The tail pulley 55 is mounted to the leading rod portion 51 of a tail pulley eccentric 50. See FIG. 7. The tail pulley 55 is mounted to the rod portion 51 by means of two bearings 54 and a tension pin 61. The tail pulley eccentric 50 includes an offset rod portion 52 which projects opposite the forward rod portion 51 of the tail pulley eccentric 50. The purpose of the tail pulley eccentric 50 is to provide the user of the packaging machine 10 with the ability to quickly and easily move the tail pulley 55 relative to the side seal assembly 20, one tail pulley 55 being mounted to one side of the upper face plate 92 and another being mounted to the same side of the lower face plate 93. See FIGS. 2 and 8. The tail pulley eccentric 50 is spring-loaded by virtue of a torsion spring 58 and a tail pulley clip 59. The tail pulley eccentric 50 is moveable by means of a tail pulley knob assembly 53 which is disposed to the back side of either the top or bottom back plates 90, 91, with a collar 62 disposed therebetween. The tail pulley 55 also includes a first belt recess 57 and a second belt recess 56, the latter of which is tapered.

Figure 9:
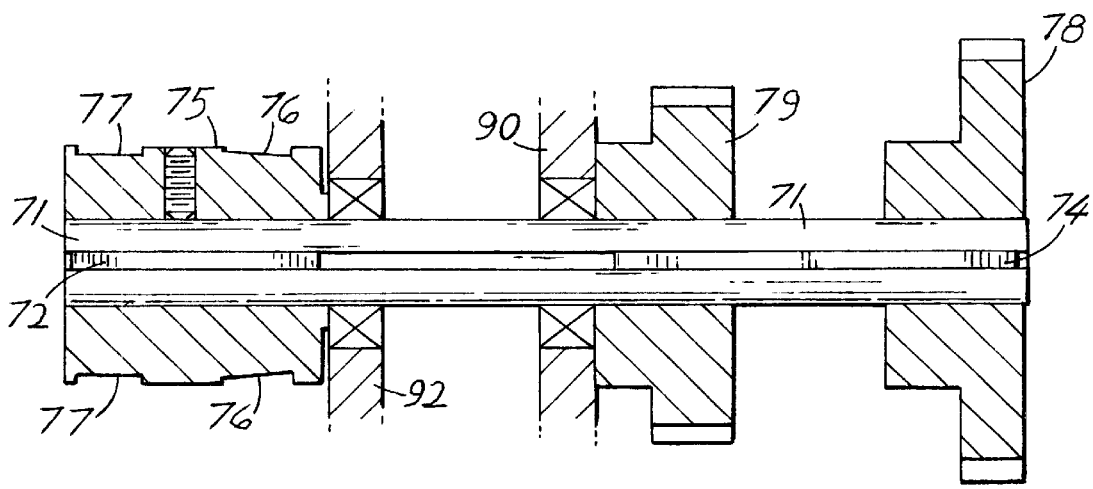
FIG. 9 is an enlarged cross-sectioned right side elevational view of a drive pulley subassembly of the apparatus shown in FIG. 2.

The side sealer assembly 20 includes a front drive pulley 75 which is similarly mounted to and through the seal frame upper plates 90, 92 and another drive pulley 75 mounted to the lower plates 91, 93 by means of a drive shaft 71. The drive shaft 71 and the drive pulley are each keyed to receive a drive line key 72 therewithin. See FIGS. 2 and 9. To the rear, or backside, of the upper and lower back plates 92, 93, respectively, the drive shaft 71 is configured with a pair of drive sprockets 78, 79, each of which is also keyed for receiving a second drive line key 74. While the preferred embodiment contemplates the use of a conventional chain for engagement with and driving of the sprockets 78, 79, such is not a limitation of the present invention and the precise drive mechanism can be varied without deviating from the scope of the invention. The drive pulley 75 includes a first belt recess 77 and a second tapered belt recess 76. It should be noted that the taper of the belt recess 76 of the drive pulley 75 is opposite that taper which is machined into the second belt recess 56 of the tail pulley 55. The purpose of this will become further apparent later.

Figure 10:
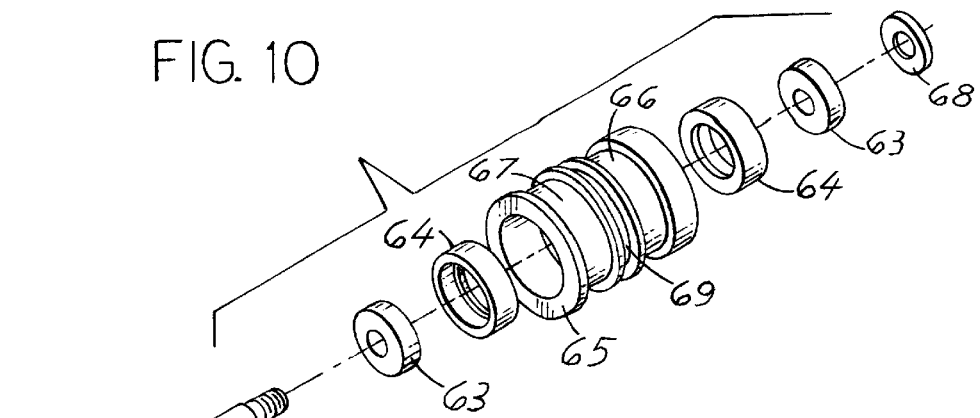
FIG. 10 is an enlarged exploded front and right side perspective view of an idler pulley subassembly of the side sealing apparatus shown in FIG. 2.
Figure 11:
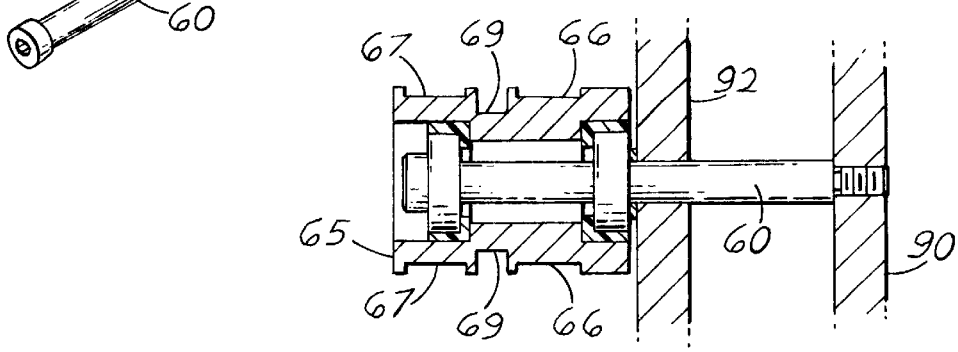
FIG. 11 is a further enlarged cross-sectioned right side elevational view of the idler pulley subassembly of the side sealing apparatus shown in FIG. 2.
Figure 12:
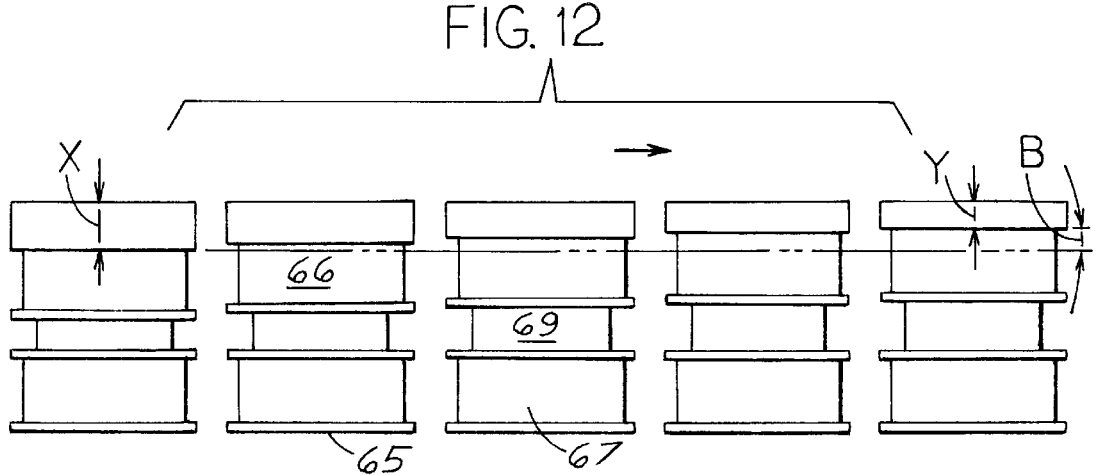
FIG. 12 is a top plan view of one set of idler pulleys shown in FIG. 2.

Linearly disposed between each front drive pulley 75 and each tail pulley 55 are a number of similarly configured belt idler pulleys 65. In the preferred embodiment, five such idler pulleys 65 are provided. See FIG. 2. Each idler pulley 65 includes a first belt recess 67, a second belt recess 66 and a central hot wire clearance recess 69. See FIGS. 10 and 11. This central recess 69 is cut relatively deeper into the idler pulley 65 than are the other belt recesses 66, 67. The purpose of this is to allow each idler pulley 65 to clear the hot wire 40 which lies between the traveling belts. See FIG. 17. Each idler pulley 65 is rotatable about and mounted on a shoulder screw 60 by means of a pair of bearings 63. Disposed between those bearings 63 and the belt idler pulley 65 are a pair of idler pulley insulators 64. The idler pulley insulators 64 are electrically nonconductive, the purpose of which is to prevent a short to the side seal assembly 20 in flue event of unintentional contact between the hot wire 40 and any one or more of the idler pulleys 65. The shoulder screw 60 is secured to the rear of the seal frame back plates 90, 91 and the idler pulley is spaced away from the front of the face plates 92, 93 by use of a bushing 68. In the preferred embodiment, the first belt recess 67 of each idler pulley 65 is colinear. That is, a continuous belt 80 traveling along one side of them is held in a straight line and the continuous belt 80 overall is held, in the shape of an elongated oval, in a vertical plane. Such is not the case with the second belt recess 66 of each idler pulley 65. In the preferred embodiment, the pulleys 65 are collinear and the path formed by the second belt recesses 66 is also collinear, but the plane of the belt 81, though vertical, diverges away from the plane formed by the belt 80 held within the first belt recess 67 at an angle B as shown in FIG. 12. Similarly, the distance from the innermost edge of the second belt recess 67 to the innermost edge of the idler pulley 65 decreases from X to Y along the continuum shown in FIG. 12 as well. In this regard, see also FIG. 17 which shows the divergence between the belts 80, 81 as described above.

Figures 13, 14, 15:
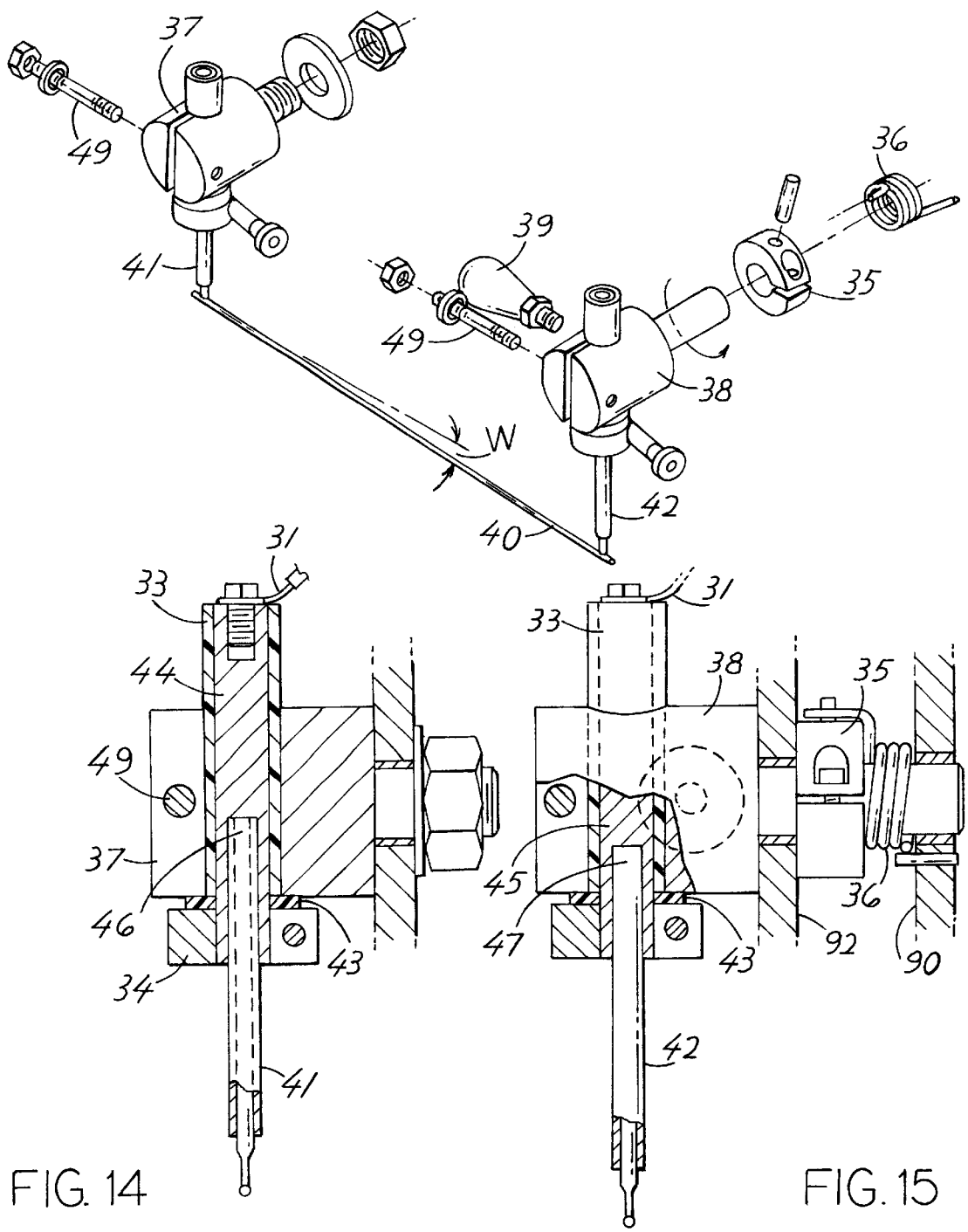
FIG. 13 is an enlarged and exploded front and right side perspective view of a hot wire subassembly of the side sealing apparatus shown in FIG. 2.
FIG. 14 is a further enlarged cross-sectioned right side elevational view of the stationary attachment portion of the hot wire subassembly shown in FIG. 13.
FIG. 15 is a further enlarged cross-sectioned right side elevational view of the pivoting attachment portion of the hot wire subassembly shown in FIG. 13.
Figure 16:
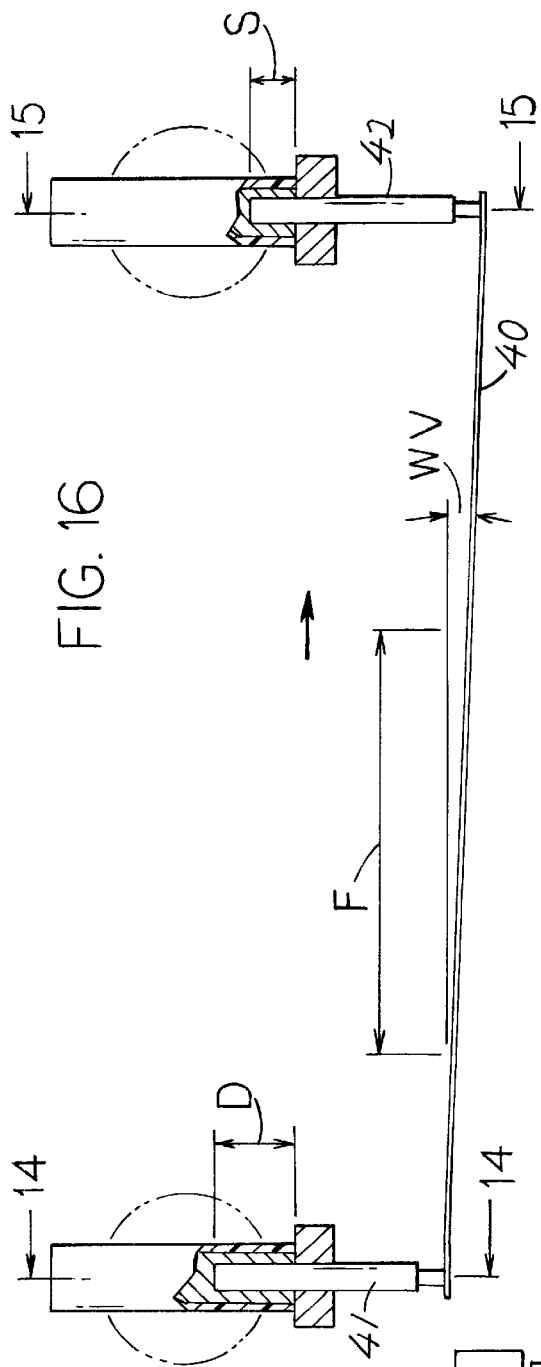
FIG. 16 is a partial cross-sectioned and front elevational view of the hot wire subassembly shown in FIGS. 2 and 13.
Figure 17:
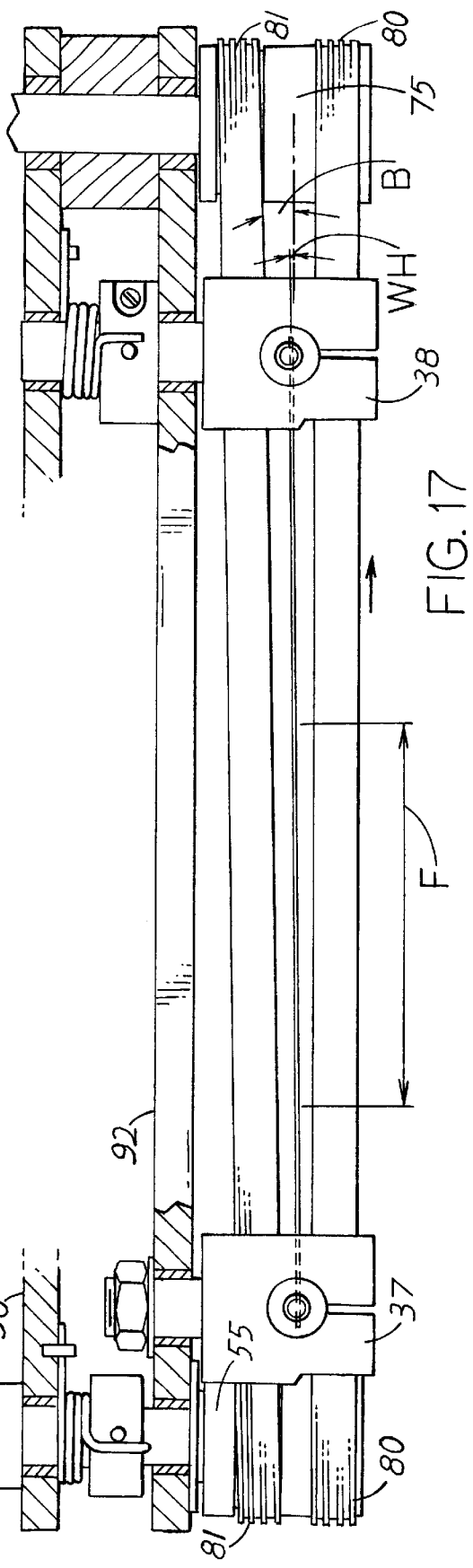
FIG. 17 is a further enlarged and partial cross-sectioned top plan view of the hot wire and pulley subassemblies of the side sealing apparatus shown in FIG. 2.

The side sealer assembly 20 of the present invention also includes a hot wire 40 which is functionally adapted to cut and weld adjacent layers of thermoplastic film 1 as they pass by it. A stationary wire mounting block 37 and a pivoting wire mounting block 38 are provided. The stationary wire mounting block 37 is mounted above and just inside the tail pulley 55 along the seal frame upper face plate 92. Similarly, the pivoting wire mounting block 38 is pivotally mounted to the seal frame upper face plate 92 above and just inside the front drive pulley 75. In the preferred embodiment, the direction of article 8 travel relative to the side sealer assembly 20 is from the direction of the stationary wire mounting block 37 and towards the pivoting wire mounting block 38 for reasons which will be explained later. The stationary wire mounting block 37 is electrically isolated from a charge which is provided by an electrical wire 31 connected to an internal wire assembly clamp 44 by means of a phenolic insulating sleeve 33. The bottommost portion of the wire assembly clamp 44 is further electrically isolated by virtue of a phenolic washer 43. The wire assembly clamp 44 includes an internal bore 46 which is machined at a predetermined depth. The internal bore 46 is functionally adapted to receive one lead end 41 of the hot wire 40. See FIG. 14. Similarly, the pivoting wire mounting block 38 is electrically isolated from a charge which is provided by an electrical wire 31 connected to an internal wire assembly clamp 45 by means of a phenolic insulating sleeve 33. The bottommost portion of the wire assembly clamp 45 is further electrically isolated by virtue of a phenolic washer 43. The wire assembly clamp 45 includes an internal bore 47 which is machined at a predetermined depth and is functionally adapted to receive a second lead end 42 of the hot wire 40. See FIG. 15. In the preferred embodiment, the depth of the bore 46 of the stationary wire clamp 44 is 1.00 in. whereas the depth of the bore 47 of the pivotal wire clamp 45 is 0.75 in. In this fashion, a stock wire 40 having lead ends 41, 42 which are 2.50 in. long drops about 0.25 in. in a run of about 8.125 in., or at an angle WV as shown in FIG. 16. Fine adjustment of the wire ends 41,42 may be accomplished by use of side bolts 49. See FIG. 13. Also in the preferred embodiment, the wire 40 diverges at an angle WH as shown in FIG. 17, which divergence is about 0.32 in. over the 8.125 in. run mentioned above. This divergence is at an angle WV relative to the path of the forwardly disposed belts 80, 82 shown in FIG. 2B.

The pivoting mounting block 38 is spring-loaded by virtue of a torsion spring 36 and a wire tensioner collar 35, both of which are disposed between the seal frame upper back and face plates 90, 92, respectively. The mounting block 38 is movable by means of a knob assembly 39 which is attached to one side of the block 38. In this fashion, rotation of the block 38 releases tension of the wire 40 and allows quick and easy removal of the wire ends 41,42 from the wire assembly clamps 44,45.

Figure 5:
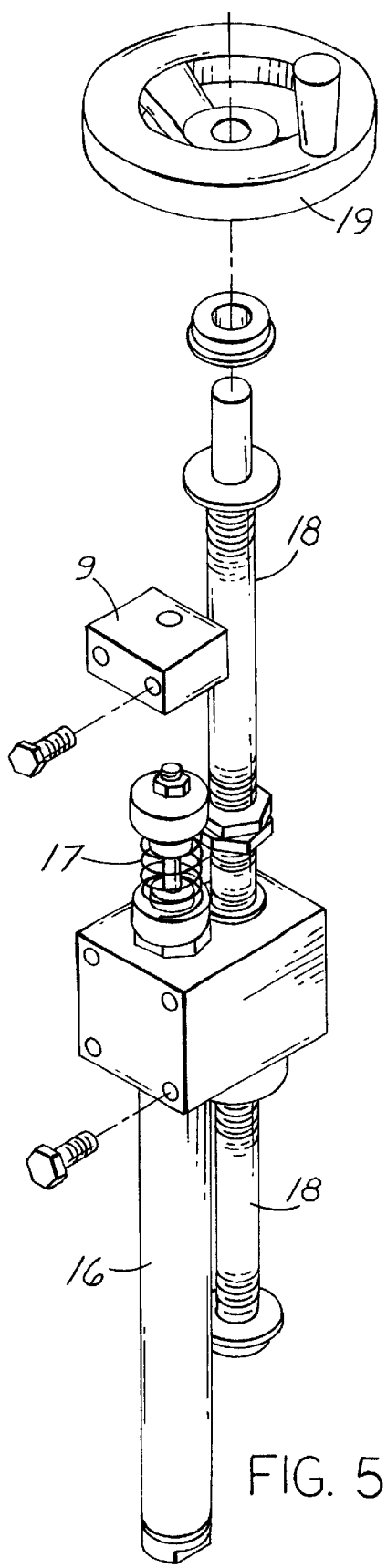
FIG. 5 is a further enlarged front right side exploded perspective view of another subassembly of the side sealing apparatus shown in FIG. 2.
Figure 6:
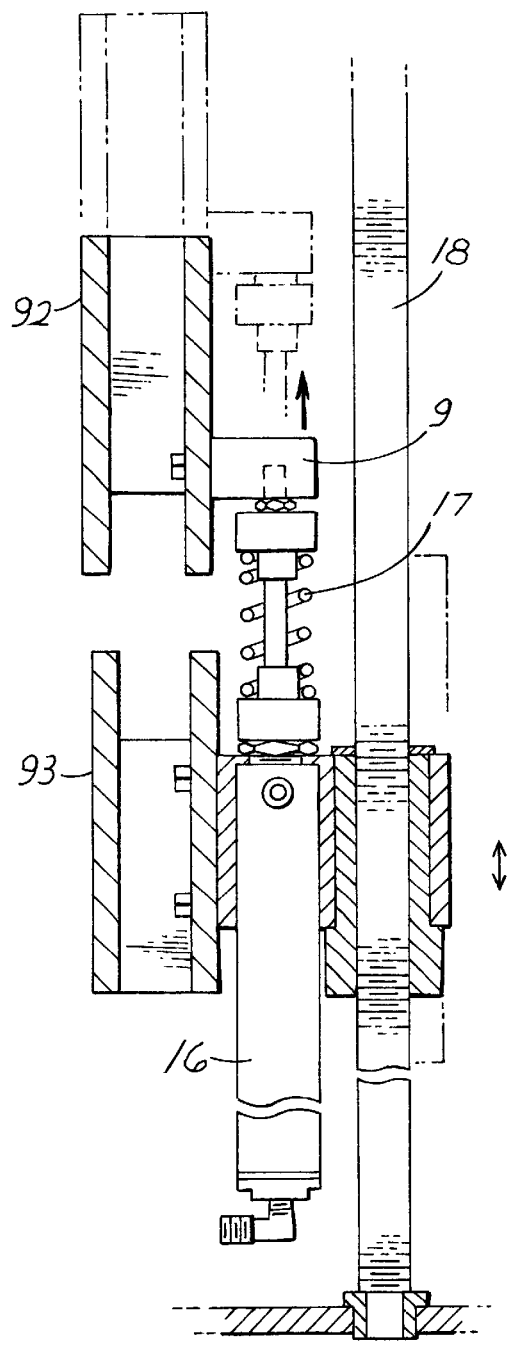
FIG. 6 is a partial and cross-sectioned right side elevational view of the side sealing apparatus shown in FIG. 2.

As previously alluded to, the arrangement of a front drive pulley 75, a tail pulley 55 and the belt idler pulleys 65 which are disposed between them is duplicated along the lower face plate 93 of the side sealer assembly 20. The size, shape and configuration of each pulley is effectively mirrored in substantially vertical alignment with its upper face plate counterpart. The pulleys may also be slightly offset to effectively create a greater area of belt surface contact between upper and lower cooperating pulleys. As they lie in a vertical plane extending from the front drive pulley 75 to the tail pulley 55, the pulleys 55, 65, 75 which are attached to the seal frame upper face plate 92 are slightly disposed outwardly relative to their counterparts in the seal frame lower face plate 93. As discussed earlier, this is the result of machining to the bottom seal frame bearings 97, 99 by 0.046 in. This is a very important distinctive feature over prior art in that it allows the cooperating V belts 80, 82 and 81, 83 which have a meshing-teeth configuration to engage each other in a meshing fashion. More specifically, this feature allows the cooperating V belts 80, 82 and 81, 83 to firmly grasp the edge 6 of the thermoplastic film 1. See FIG. 2A. Slippage is completely eliminated and distortion of the film 1 is minimized. This results in an extremely smooth and consistent weld along the film edge 6. See FIG. 2B. The divergence of the belt paths, i.e. top inner belt 81 away from top outer belt 80 and bottom inner belt 83 away from bottom outer belt 82, also results in a positive 16 withdrawal of the trimmed post-welding edge away from the side sealed article 8. Vertical movement of each set of pulleys towards or away from each other is accomplished by use of an air cylinder 16. See FIGS. 5 and 6. In the preferred embodiment, the bottom set of pulleys which are attached to the seal frame lower plates 91, 93 are moveable vertically by means of an elevational screw 18 which sets the height of the seal assembly 20 for optimum position relative to the size of the article 8. Actuation of the air cylinder 16 one way separates the upper and lower pulley and belt assemblies so as to allow the leading edge 6 of the film to be inserted between the belts 80, 81, 82, 83. Actuation of the air cylinder 16 another way closes the belts 80, 81, 82, 83 towards one another, the force of the cylinder 16 being dampened by means of a dampening spring 17.

Figure 19:
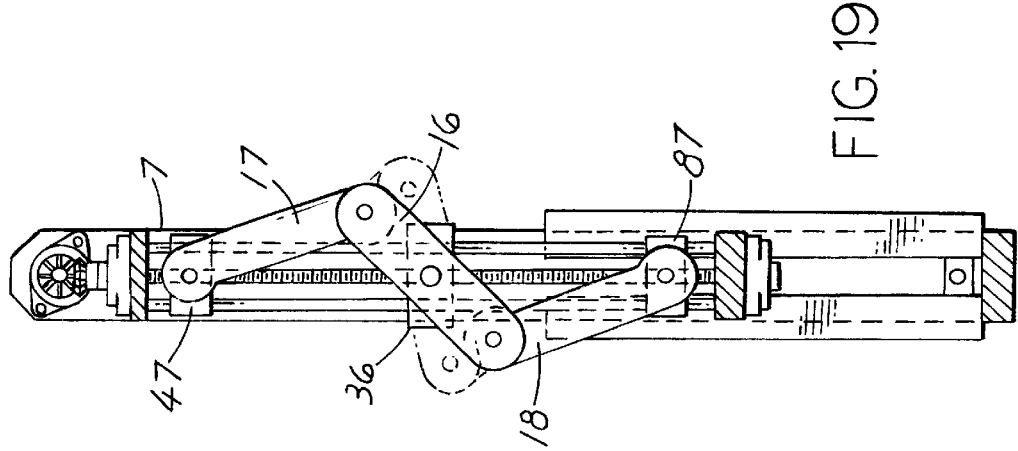
FIG. 19 is a partially cross-sectioned rear elevational view of the end sealing apparatus taken along line 19—19 of FIG. 18.
Figure 18:
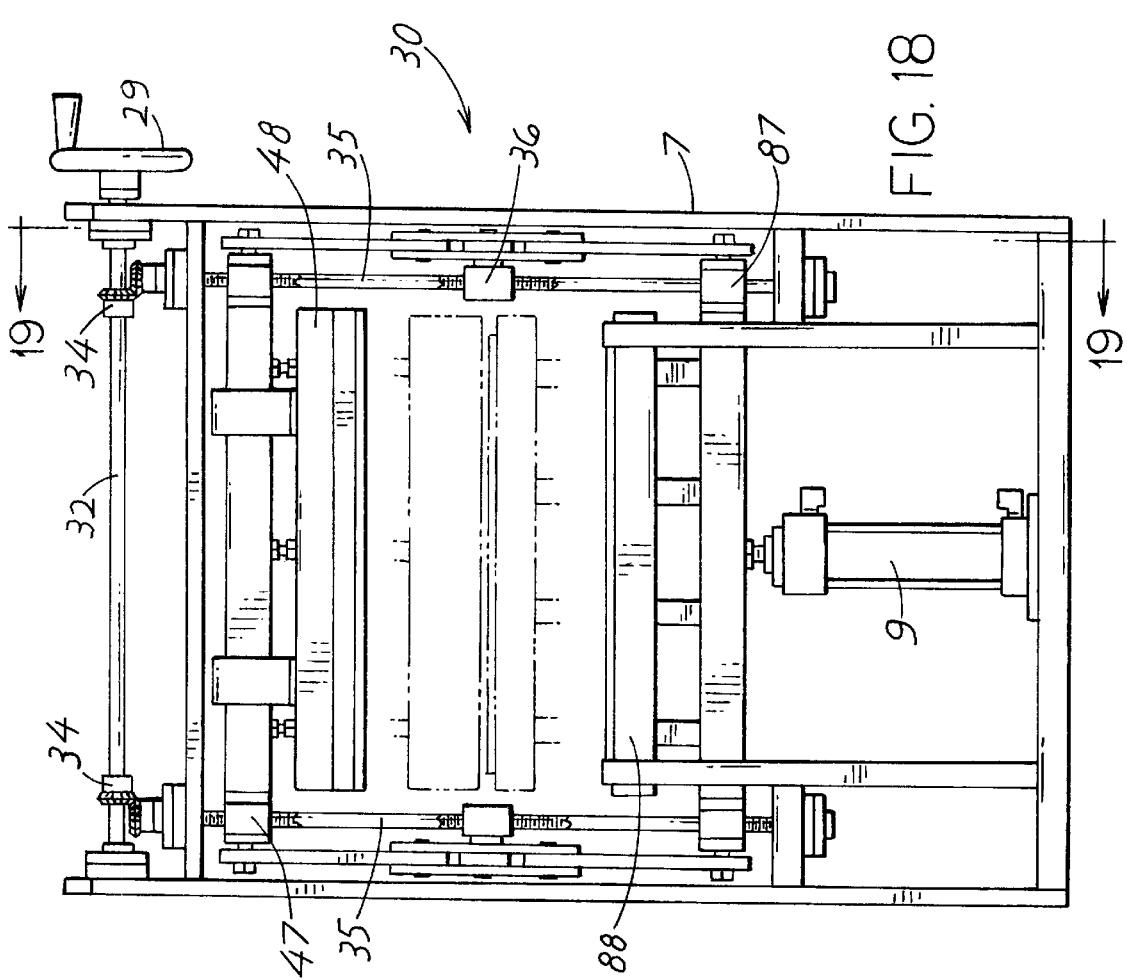
FIG. 18 is a left side elevational view of the end sealing apparatus of the present invention.

Referring now to FIGS. 18 and 19, the details of the end sealer, generally identified 30, are illustrated. In particular, an end sealer frame 7 is provided which supports a pair of vertically disposed elevation screws 35. Each elevation screw 35 is rotatable about a vertical axis by means of a drive wheel 29 which, when rotated, turns a horizontally disposed drive bar 32 and a pair of elevation drive gear assemblies 34. A rocker pivot 36 is movable along the vertical flight of the elevation screw 35 so as to orient a rocker pivot 36 at the desired center point of the assembly 30 relative to the article 8 to be sealed. A rocker 16 is rotatably attached to the rocker pivot 36 and an upper arm 17 and a lower arm 18 are also provided. The upper and lower arms 17, 18, respectively, are likewise rotatably mounted at one end to the rocker 16. The opposite end of the upper arm 17 is rotatably attached to a top seal bar assembly 47. Similarly, the opposite end of the lower arm 18 is rotatably attached to a bottom seal bar assembly 87. The top seal bar assembly 47 includes a top seal bar 48 and the bottom seal bar assembly 87 includes a bottom seal bar 88, the top and bottom seal bars 48, 88, respectively, being functionally adapted to cooperate in the end sealing of the leading edge of the thermoplastic film 1 which approaches the end seal assembly 30. The bottom seal bar assembly 87 is movable actuated by means of an air cylinder 9 which is mounted within the frame 7.

In operation, the position of the side sealer assembly 20 and of the end sealer assembly 30 are adjusted to accommodate the size of the article 8 which is to be packaged. The article 8 enters the film envelope 1 with the adjacent film edges 4, 5 overlaying one another. The film edges 4, 5 enter the side sealer assembly 20 at the point where the cooperating tail pulleys 55 are situated. Note that the tail pulleys 55 are somewhat separated to allow for some fluctuation in the film 1 positioning. See FIG. 2. As the film 1 advances, the adjacent film edges 45 are firmly grasped within the teeth 86 and grooves 85 of the outwardly disposed belts 80, 82 and the inwardly disposed belts 81, 83 of the side sealer assembly 20. See FIG. 2A. As the film 1 continues to be advanced, the diverging sets of belts 80, 82 and 81, 83 pull and stretch the film 1 therebetween. As this is occurring, the film begins to enter the fusion area F of the hot wire 40. See FIG. 16. This fusion area F is the point generally at which the wire 40 descends below the horizontal plane of film 1 which is belt captured. The heat from the hot wire 40 creates a weld 19 along the film edge closest to the outwardly disposed belts 80, 82, which weld 19 is the final side weld for the article 8. A second weld 39 is created along the film edge closest to the inwardly disposed belts 81, 83 and which is being pulled away from the first weld 19 by virtue of the divergence of the belts previously described. The quality of the final weld 19 which travels along with the article 8 is preserved by virtue of the divergence of the wire 40 away from the weld 19 also as previously described. As the side sealed article 8 continues, the air cylinder 9 of the end sealer assembly 30 is actuated to move the bottom seal bar assembly 87 upwardly and, by virtue of the rocker 16 and rocker arms 17, 18, the top seal bar assembly 47 downwardly to effect an end seal between the top and bottom seal bars 47, 87, respectively. The article 8 continues to advance and the end sealer assembly 30 is again actuated to end seal the trailing edge of the plastic encased article 8. If, during this process, a belt 80, 81, 82, 83 or wire 40 needs to be replaced, the non-tool movement of one of the tail pulleys 55 or the non-tool pivoting of the wire mounting block 38 quickly and easily allows the insertion of the replacement part without any need to readjust or realign the side sealer assembly 20.

From the foregoing description of the illustrative embodiment of the invention set forth herein, it will be apparent that there has been provided a new and useful method and apparatus for securely grasping and advancing the adjacent layers of thermoplastic film through the side sealing mechanism of a packaging machine; which maintains the integrity of the heat-induced weld which is created at the side sealing mechanism and at the end sealing mechanism of the packaging machine; and which makes the side sealing mechanism an apparatus in which the consumables utilized within the side sealing mechanism can be maintained or replaced by the user without the need for tools or special post-replacement adjustments.

The principles of this invention having been fully explained in connection with the foregoing, we hereby claim as my invention:

1. A method for wrapping a dimensioned article in heat sealable thermoplastic film which comprises the steps of providing a supply of center folded thermoplastic film, said film supply consisting of two longitudinally extending adjacent layers of film folded over one atop the other and forming a space therebetween, introducing a dimensioned article within said film space, said film supply further including two film edges which form a longitudinally extending opening to one side of said article, said dimensioned article having a horizontal midline, a leading portion and a trailing portion, securely grasping the edges of said film at or near the horizontal midline of said article, providing a first heat source, advancing said film edges in close proximity to said first heat source, heat induced fusing of said film edges along said longitudinally extending film opening by nearly contacting the film edge with the first heat source, forming a first weld along said fused edges, forming a second weld along a waste portion of the fused edges, diverging said second weld away from said first heat source, providing a second heat source, advancing said article towards said second heat source, heat induced fusing of the film layers at or near the horizontal midline of the leading portion of the article, further advancing said article away from said second heat source, and heat induced fusing of the film layers at or near the horizontal midline of the trailing portion of the article, whereby the article is wrapped within a layer of thermoplastic film.

2. The method of claim 1 including, prior to said film grasping step, the step of providing two sets of cooperating pulleys, each pulley set including a drive pulley, a tail pulley and a plurality of idler pulleys linearly disposed between said drive pulley and said tail pulley.

3. The method of claim 2 including, after said pulley providing step, the step of providing a first belt pathway and a second belt pathway about the perimeter of each pulley in each of said pulley sets, said first and second belt pathways each being functionally adapted to form a guide means for a belt held therewithin.

4. The method of claim 3 including, prior to said film grasping step, the step of diverging said second belt pathway away from said first belt pathway in each pulley set.

5. The method of claim 4 including, prior to said film grasping step, the step of providing a pair of belts for each pulley set, each belt having an outer face with a pattern running longitudinally with said belt and having a plurality of longitudinally extending ribs and longitudinally extending grooves formed therein, one belt being retainably rotatable within the first belt pathway of each of said pulley sets and the other belt being retainably rotatable within the second belt pathway of each of said pulley sets.

6. The method of claim 5 including, prior to said film grasping step, the step of electrically isolating the idler pulleys of each pulley set.

7. The method of claim 6 including, prior to said film grasping step, the step of providing a torsional spring tensioning means to the tail pulleys of each pulley set whereby a belt retained by each pulley set may be releasably removed from said pulley set.

8. The method of claim 7 including, prior to said film grasping step, the step of offsetting each pulley set from the other whereby the ribs and grooves of cooperating belts mesh with each other to positively retain one or more layers of film therebetween.

9. The method of claim 8 including, prior to said film grasping step, the step of providing air actuation means for vertically moving one pulley set towards or away from the other pulley set.

10. The method of claim 9 wherein said first heat source providing step includes providing a hot wire assembly, said hot wire assembly including a first wire retention clamp, a second wire retention clamp and a hot wire extending between said first and second retention clamps, said wire have a first wire end and a second wire end, said hot wire assembly being configured to locate the hot wire between the belts of each pulley set and each of said wire retention clamps being functionally adapted to retain one wire end therewithin and to provide for the quick release of the wire end retained.

11. The method of claim 10 wherein said first heat source providing step further includes providing means for diverging said hot wire downwardly from said first wire retention clamp at an acute angle relative to the horizontal and providing means for diverging said hot wire horizontally away from said first belt pathway.

12. The method of claim 11 wherein said first heat source providing step includes the step of providing a second wire retention clamp which is torsionally rotational to apply tension force to said hot wire.

13. The method of claim 12 wherein said steps for fusing said film layers at the horizontal midline of the leading portion and the trailing portion of an article include the steps of providing a horizontal flight path upon which the bottommost portion of said dimensioned article is supported, providing a horizontally extending top seal bar and providing a horizontally extending bottom seal bar, said bottom seal bar being actuable to move vertically from a first position below said article flight path to a point at or near the horizontal midline of said article, said top and bottom seal bars being vertically movable towards and away from one another.

14. The method of claim 13 wherein said seal bar providing steps include the step of providing a rocker arm which is pivotable about an axis, said rocker arm having a first end and a second end, the first end of said rocker arm being connected to said bottom seal bar and the second end of said rocker arm being connected to said top seal bar whereby actuation of the bottom seal bar effects a rotation of the rocker arm and a movement of the top seal bar toward said bottom seal bar.

15. The method of claim 14 wherein said rocker arm providing step includes the step of variably adjusting the rocker arm axis relative to the vertical whereby the top seal bar and said bottom seal bar are functionally adapted to meet at the rocker arm axis and at the horizontal midline of articles of various dimensions.

16. An apparatus for wrapping a dimensioned article in heat sealable thermoplastic film which comprises a conveyor for advancing said article in a continuous longitudinal direction and at a continuous speed, a supply of heat sealable thermoplastic film, said film supply consisting of two longitudinally extending adjacent layers of film folded over one atop the other and forming a space therebetween, means for introducing a dimensioned article within said film space, said film supply further including two film edges which form a longitudinally extending opening to one side of said article, said dimensioned article having a horizontal midline, a leading portion and a trailing portion, means for grasping the edges of said film at or near the horizontal midline of said article, a first heat source, means for advancing said film edges in close proximity to said first heat source, means for heat induced fusing of said film edges along said longitudinally extending film opening, means for forming a first weld along said fused film edges, means for forming a second weld along a waste portion of the fused edges, means for diverging said second weld away from said first heat source, a second heat source, means for advancing said article towards said second heat source, means for heat induced fusing of the film layers at or near the horizontal midline of the leading portion of the article by contacting or nearly contacting the film layers with the second heat source, means for further advancing said article away from said second heat source, and means for heat induced fusing of the film layers at or near the horizontal midline of the trailing portion of the article by contacting or nearly contacting the film layers with the second heat source, whereby the article is wrapped within a layer of thermoplastic film.

17. The apparatus of claim 16 wherein said film edge grasping means includes two sets of cooperating pulleys, each pulley set including a drive pulley, a tail pulley and a plurality of idler pulleys linearly disposed between said drive pulley and said tail pulley.

18. The apparatus of claim 17 wherein said film edge grasping means includes a first belt pathway and a second belt pathway defined about the perimeter of each pulley of each of said pulley sets, said first and second belt pathways each being functionally adapted to form a guide means for a belt held therewithin.

19. The apparatus of claim 18 wherein said film edge grasping means and said film edge advancing means includes a pair of belts for each pulley set, each belt having an outer face with a pattern running longitudinally with said belt and having a plurality of longitudinally extending ribs and a plurality of alternating longitudinally extending grooves formed therein, one belt being retainably rotatable within the first belt pathway of each of said pulley sets and the other belt being retainably rotatable within the second belt pathway of each of said pulley sets.

20. The apparatus of claim 19 wherein each of the idler pulleys of each pulley set is electrically isolated.

21. The apparatus of claim 20 wherein the tail pulley of each pulley set includes a torsional spring tensioning means whereby a belt retained by each pulley set may be releaseably removed from said pulley set.

22. The apparatus of claim 21 wherein each pulley set is offset from the other whereby the ribs and grooves of cooperating belts mesh together to positively retain one or more layers of film therebetween.

23. The apparatus of claim 22 including air actuation means for vertically moving one pulley set towards or away from the other pulley set.

24. The apparatus of claim 23 wherein said first heat source comprises a hot wire assembly, said hot wire assembly including a first wire retention clamp, a second wire retention clamp and a hot wire extending between said first and second retention clamps, said wire having a first wire end and a second wire end, said hot wire assembly being configured to locate the hot wire between the belts of each pulley set and each of said wire retention clamps being functionally adapted to retain one wire end therewithin and to provide for the quick release of the wire end retained.

25. The apparatus of claim 24 wherein said hot wire is diverged downwardly from said first wire retention clamp at an acute angle relative to the horizontal and said wire is further diverged horizontally away from said first belt pathway.

26. The apparatus of claim 25 wherein said second wire retention clamp is torsionally rotatable to apply tension force to said wire.

27. The apparatus of claim 26 wherein said means for advancing and said means for fusing said film layers at the horizontal midline of the leading portion and the trailing portion of an article includes a horizontal flight path for supporting the dimensioned article, a horizontally extending top seal bar and a horizontally extending bottom seal bar, said bottom seal bar being actuable to move vertically from a first position below said article flight path to a point at or near the horizontal midline of said article, said top and bottom seal bars being vertically movable towards and away from one another.

28. The apparatus of claim 27 including a rocker arm which is pivotable about a point, said rocker arm having a first end and a second end, the first end of said rocker arm being connected to said bottom seal bar and the second end of said rocker arm being connected to said top seal bar whereby actuation of the bottom seal bar effects a rotation of the rocker arm and a movement of the top seal bar toward said bottom seal bar.

29. The apparatus of claim 28 wherein said rocker arm pivot point is variably adjustable relative to the vertical whereby the top seal bar and said bottom seal bar are functionally adapted to meet at the rocker arm pivot point and at the horizontal midline of variously dimensioned articles.

* * * * *